March 1, 1932.  P. OSTRUK  1,847,781
AUTOMOBILE TOP CONSTRUCTION
Filed Aug. 16, 1929    6 Sheets-Sheet 1
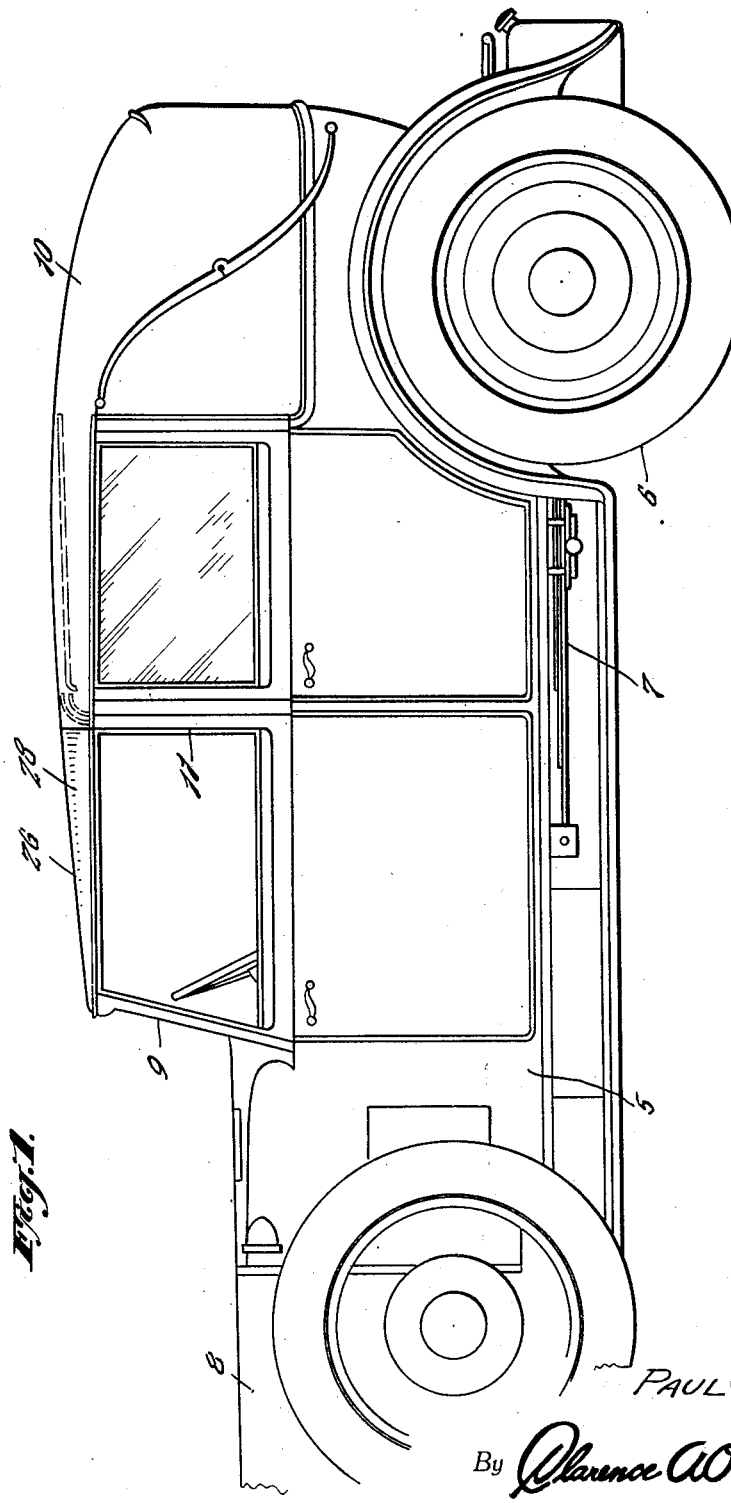
Inventor
PAUL OSTRUK.
By Clarence A. O'Brien
Attorney March 1, 1932. P. OSTRUK 1,847,781
AUTOMOBILE TOP CONSTRUCTION
Filed Aug. 16, 1929 6 Sheets-Sheet 2
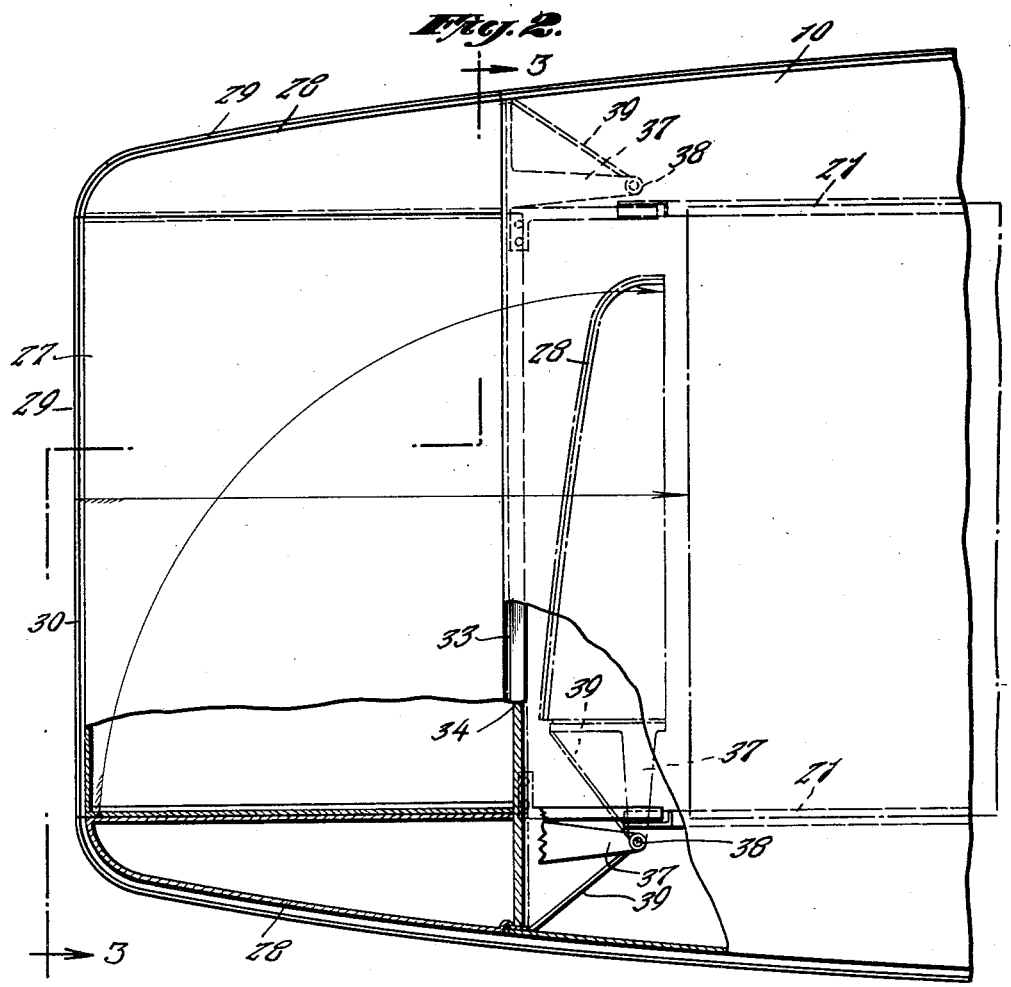
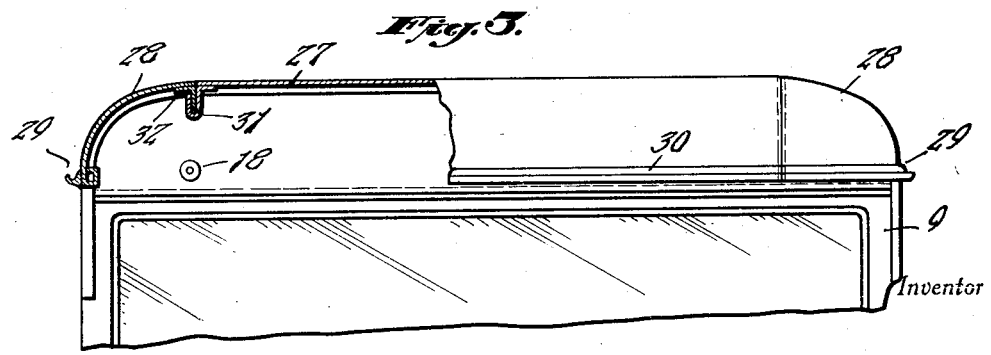
Inventor
PAUL OSTRUK.
By Clarence A. O'Brien
Attorney

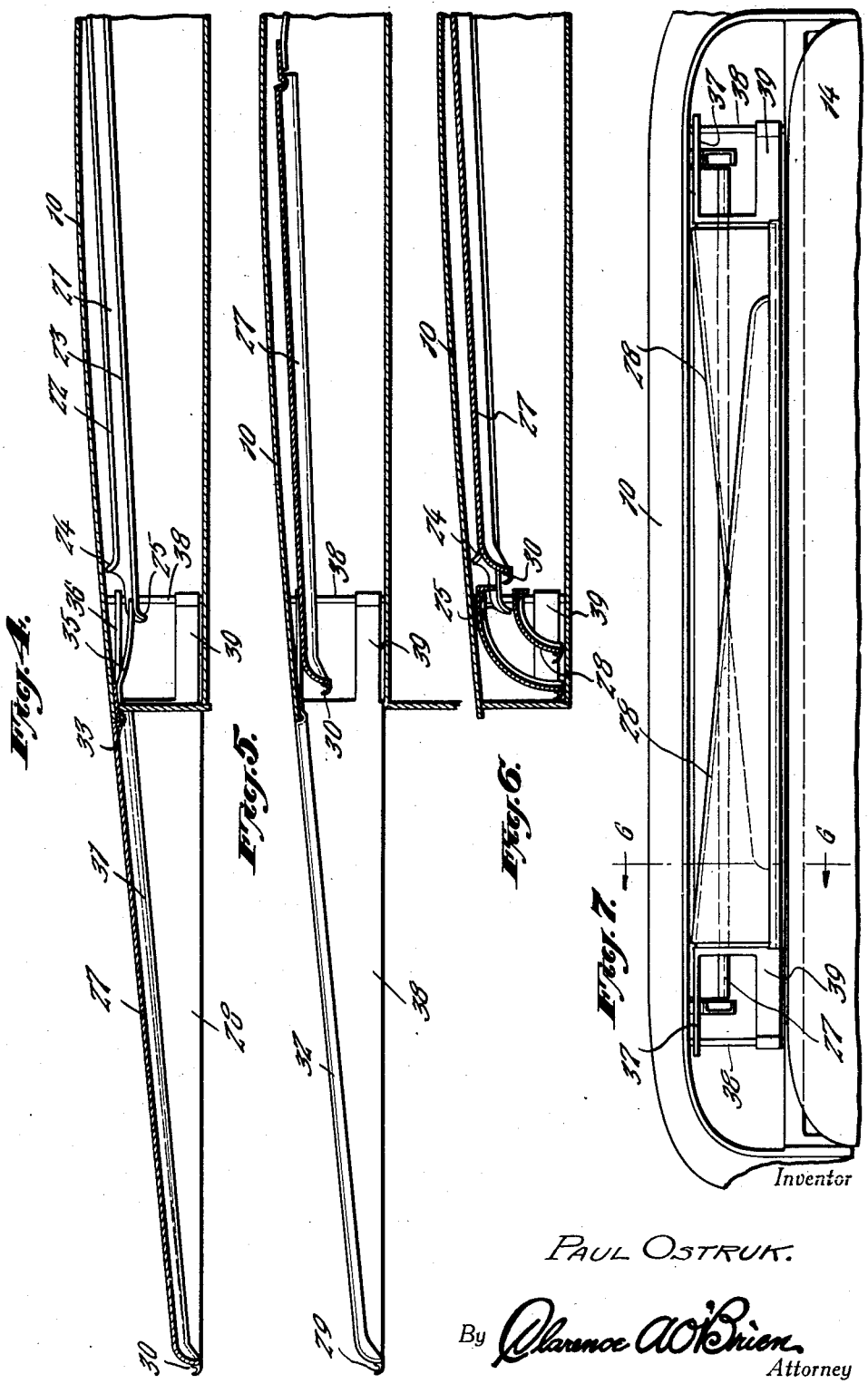

March 1, 1932. P. OSTRUK 1,847,781
AUTOMOBILE TOP CONSTRUCTION
Filed Aug. 16, 1929  6 Sheets-Sheet 4
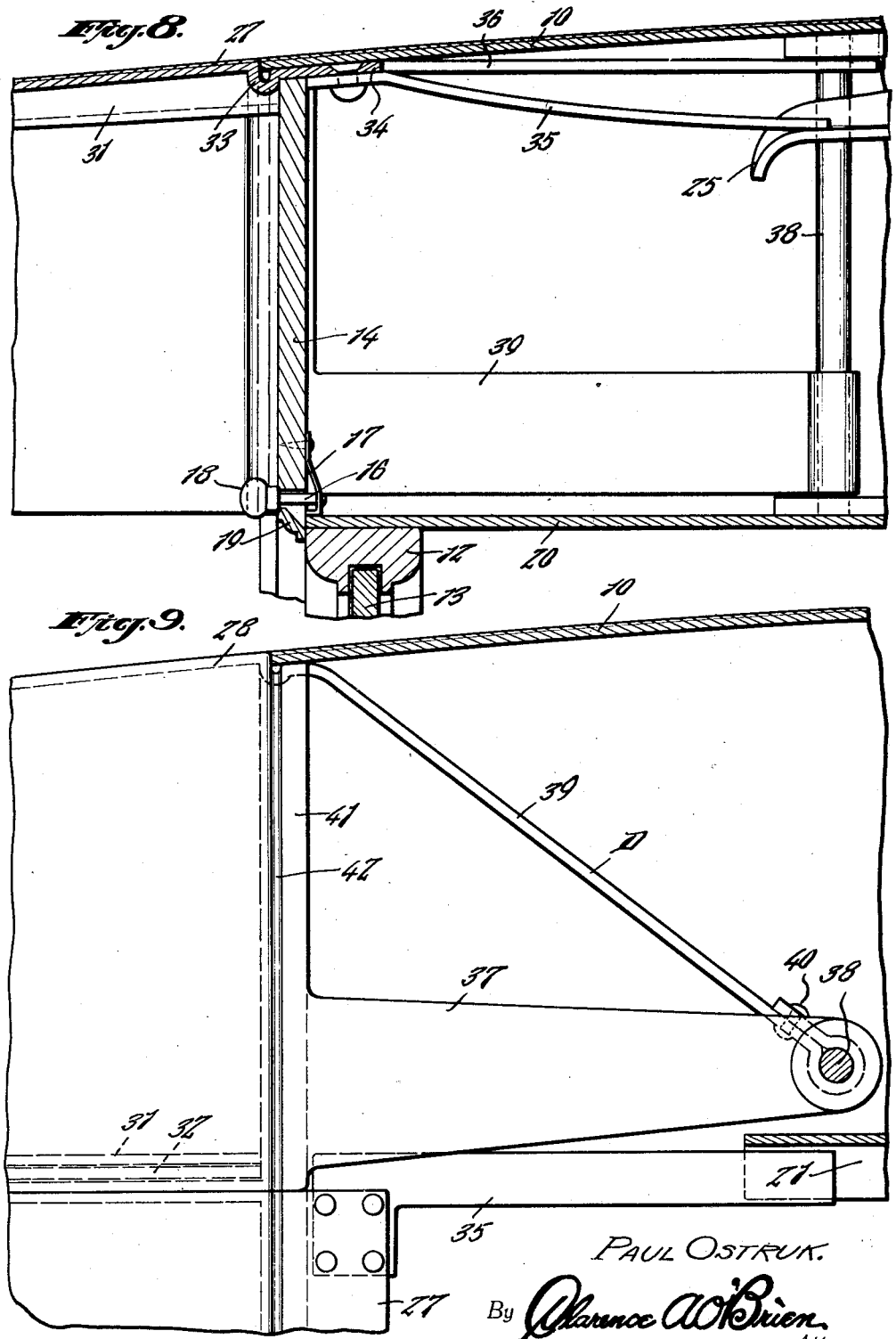

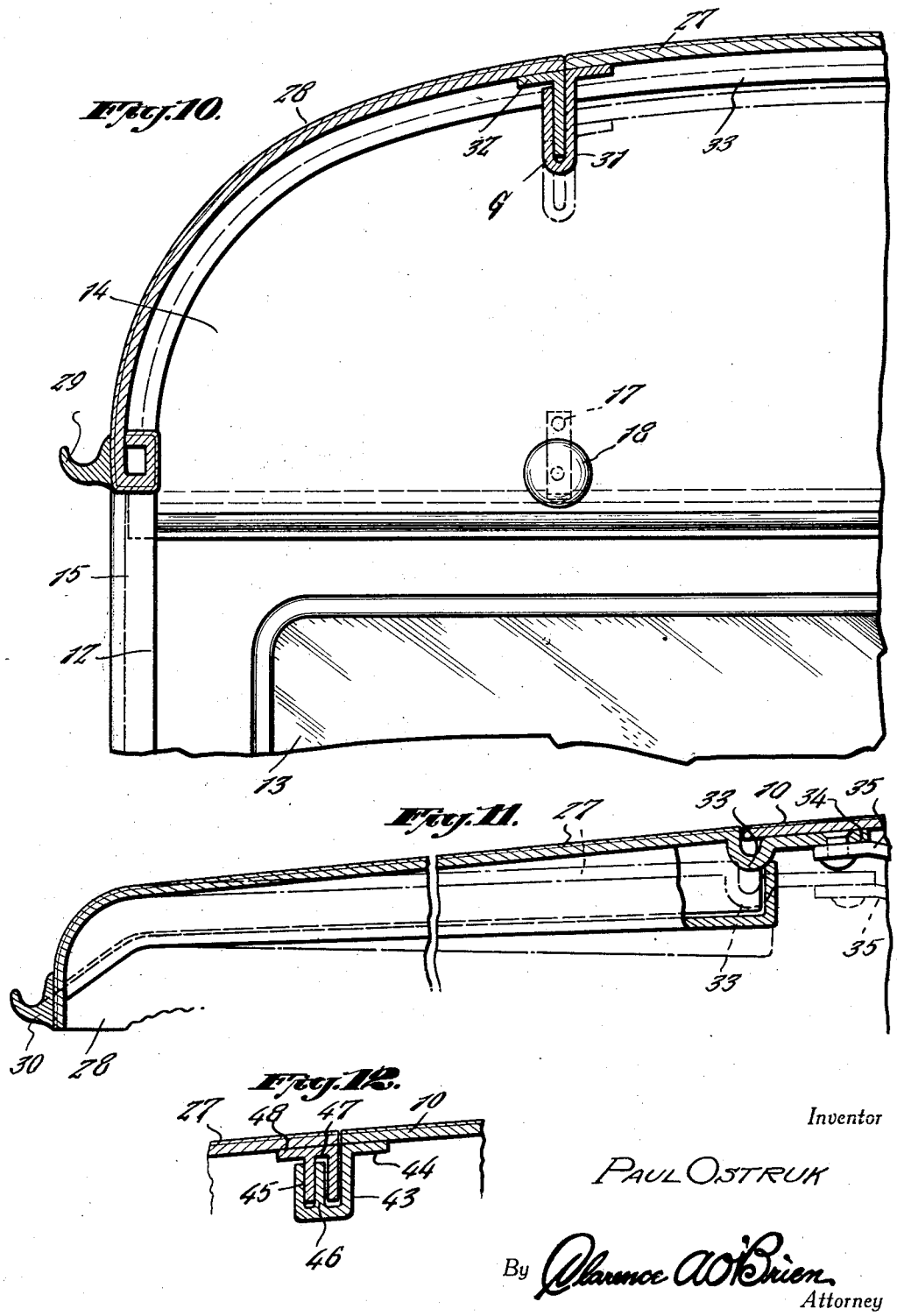

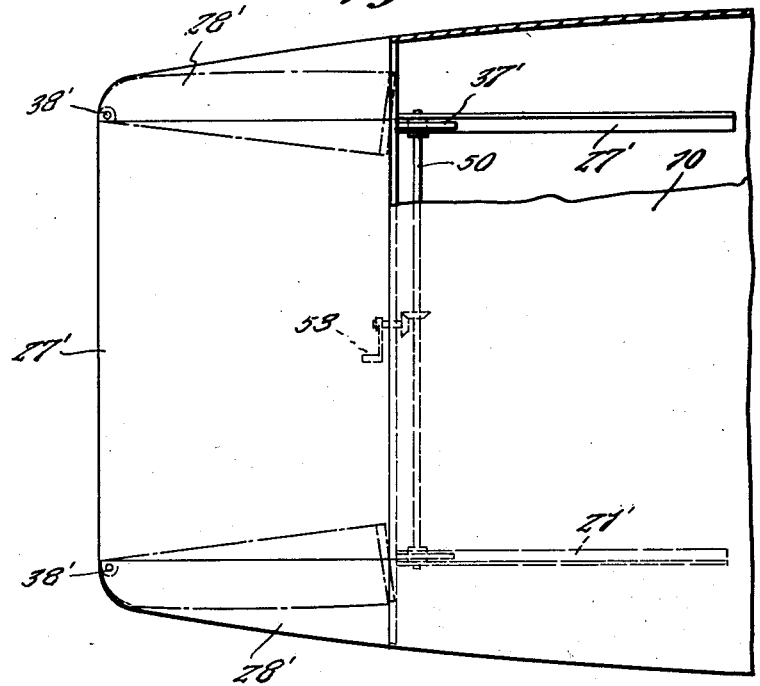
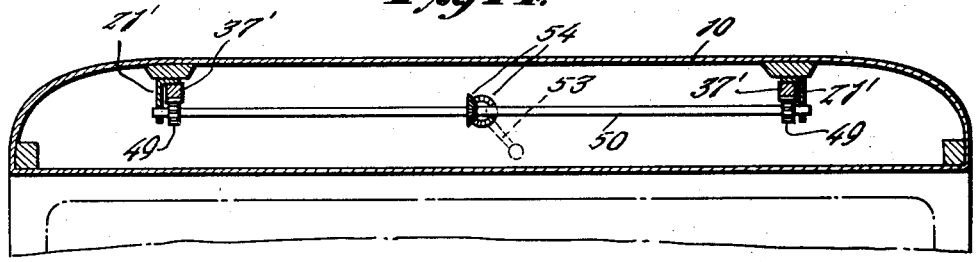
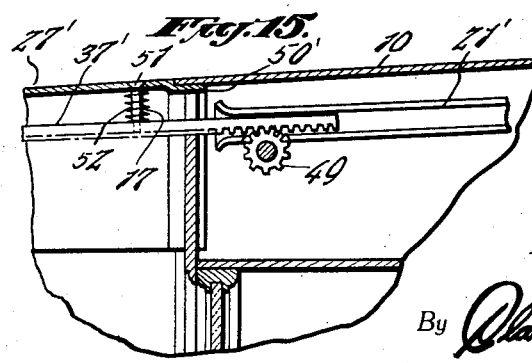

Patented Mar. 1, 1932

1,847,781

UNITED STATES PATENT OFFICE

PAUL OSTRUK, OF YONKERS, NEW YORK

AUTOMOBILE TOP CONSTRUCTION

Application filed August 16, 1929. Serial No. 386,357.

The present invention relates to new and useful improvements in tops for land vehicles, aeroplanes, and more particularly to a novel top construction for the driver's seat of any type of automobile.

The principal object of this invention is to provide a top construction for the driver's seat of a limousine wherein the top can be readily collapsed and concealed without difficulty and within a short period of time.

Another important object of the invention is to provide a collapsible and sliding top for the driver's seat of a limousine type of automobile wherein the same will be waterproof in all respects.

These and numerous other important objects and advantages of the invention will become more apparent to the reader after considering the invention as described and claimed hereinafter.

In the drawings:

Figure 1 represents a fragmentary side elevation of a limousine equipped with the improved top construction.

Figure 2 represents a fragmentary top plan view of the top construction partly broken away to disclose the construction of the collapsible forward portion.

Figure 3 represents a transverse vertical sectional view taken substantially on line 3—3 of Figure 2.

Figure 4 represents a fragmentary longitudinal sectional view showing the entire collapsible hood for the driver's seat in extended position.

Figure 5 represents a fragmentary longitudinal sectional view showing the central section of the hood in retracted position.

Figure 6 is a fragmentary longitudinal sectional view showing the entire hood in retracted position.

Figure 7 represents a fragmentary front elevation of the novel top construction, showing the collapsible hood in retracted position.

Figure 8 represents an enlarged fragmentary longitudinal sectional view showing the manner of connecting the central section of the hood to the stationary top construction.

Figure 9 represents a fragmentary horizontal sectional view.

Figure 10 represents an enlarged vertical fragmentary sectional view through one side section and a part of the central section of the hood.

Figure 11 represents an enlarged longitudinal sectional view through the novel hood construction.

Figure 12 represents a modified form of gutter construction between the hood and the stationary top.

Figure 13 represents a fragmentary top plan view of a slightly modified form of the present invention.

Figure 14 represents a fragmentary transverse sectional view disclosing the modification shown in Figure 13.

Figure 15 represents a fragmentary longitudinal sectional view disclosing the modification shown in Figures 13 and 14.

Referring to the drawings, wherein like numerals designate like parts, it will be seen that Figure 1 represents a conventional type of limousine provided with the improved top construction. The limousine consists of the body 5 supported by the wheels 6 and springs 7. The hood of the vehicle is represented by 8 and a windshield at 9. The passenger compartment is enclosed by the top construction 10, which may or may not be of the collapsible type. However, in the present instance, it will be assumed that the same is of stationary construction so that the invention may be more fully exemplified.

Posts 11 support the forward end of the top 10 and these parts are connected by a frame 12 (see Fig. 10) in which a transparent pane 13 is mounted. The foregoing is conventional structure, and the following description is based on the invention.

The forward end of the top 10 can be opened by moving slidable closure 14 which is slidable in the guideways 15 which has a latch consisting of a pin 16, spring 17, and a finger grip 18 on one end of the pin 16, the pin being adapted to be moved forwardly so as to dispose the free end of the spring 18 within the recess 19 so that the same will be disengaged from the ceiling board 20 to permit the downward movement of the said closure.

Each side wall portion of the stationary top 10 has a guide 21 secured thereto, the same being provided with upper and lower longitudinally extending flanges 22 and 23. The forward end of the upper flange 22 is curved upwardly as at 24, while the forward end portion of the lower flange 23 protrudes beyond the upwardly curved flange end 24 and is curved downwardly to provide a lip 25.

The collapsible hood for the driver's seat is generally referred to by 26 and includes a central section 27 and a pair of side sections 28—28. The side sections are curved transversely in the manner as shown in Figure 10 and taper forwardly in the manner as shown in Figure 5. Each of the side sections 28 has a gutter (preferably brass) 29 secured to its lower edge and extending from its rear end forwardly to its forward end to meet the gutter 30 on the central section 27. Each longitudinal edge portion of the central section 27 has a depending trough structure 31 secured to the underside thereof, while an angle bar 32 has one branch thereof depending for disposition within the trough 31 while its upper branch is secured to the abutting edge portion of the adjacent side section 28.

As is clearly shown in Figure 8, the central section 27 is provided at its rear end portion with a transversely disposed groove 33 for receiving water. A portion 34 extends beyond the groove 33 and is adapted to normally underlie the forward edge portion of the stationary top 10 when the collapsible hood 26 is in extended position. This extended portion 34 has a pair of leaf springs 35 projecting rearwardly therefrom and flexed in a manner to normally bear against the forward ends of the guide 21 at the said lip 25. The leaf springs 36 also project rearwardly from the forward end portion of the top 10 and these are adapted to bear tensionally on the central section 27 when the same is disposed in the retracted position as shown in Figure 5.

Each of the side sections 28 is provided with a rearwardly projecting arm 37 which is provided with an aperture at its free end for receiving the vertically supported rod 38 within the confines of the stationary top 10. A strap 39 extends from the rear outer corner of the side section and is wrapped around the rod 38 and secured as at 40.

As is clearly shown in Figures 8 and 9, the rearwardly extending portion 34 of the central section 27 as well as the rearwardly extending flanges 41 on the side sections 28 recede from their respective bodies so that the forward edge of the stationary top 10 may abut the forward side of the groove 33 which is continued across the side section and there denoted by numeral 42.

It will thus be seen that after the central section 27 has been slid rearwardly for disposition within the confines of the stationary top 10, the side sections 28—28 may be swung inwardly to assume the position shown clearly in Figure 7. After the side sections have been so disposed, the closure 14 may be fed upwardly and the latch spring 17 will engage over the ceiling board 20 in the manner as denoted in Figure 8.

A somewhat modified form of water trough between the central top section 27 and the side section 28 is represented in Figure 12. The gutter or other waterproof devices (denoted by numeral 43) the same being provided with a horizontally disposed flange 44 which may be secured to the forward end portion of the top section 27 at its underside in any manner found suitable. The trough 43 is provided with upwardly extending flanges 45 and 46 for dividing the same into a pair of grooveways. A U-bar 47 having a lateral flange 48 or in other words a bar of substantial F shape or other waterproof channels in cross section is secured to the underside of the sections 27 in the manner shown in Figure 12 with the flanges thereof depending into the grooveways of the trough structure 43. These may be placed in the outermost grooveway to insure leakproofness.

Figure 13, 14 and 15 show a slightly modified form of the invention wherein the side sections 28'—28' are hingedly connected as at 38' to the forward corners of the central section 27'. The stationary top 10 is provided with a pair of guideways 21' mounted therein for receiving the rack bars 37' mounted within the central section 27' and which project rearwardly therefrom for normal meshed engagement with the pinion 49 on the shaft 50. The rear end portions of the side sections 28'—28' as well as the rear end portion of the central section 27' are provided with receded extensions 50' against which the forward edge portion of the top 10 may snugly engage, as in the manner shown in Figure 15.

Pins 51 are each anchored at one of their ends to the central section 27' while its opposite end is slidably disposed through a corresponding opening in the rack bar 37'. A compressible spring 52 is convoluted on the pin 51 and serves to elevate the section 27' to the position shown in Figure 15. Obviously by depressing the section 27' at its rearward end portion the springs 52 will be compressed and the free end of the pin 51 projected through the corresponding rack bar 37' so that the rear end portion of the section 27' may be engaged beneath the top 10. As is clearly shown in Figure 15, the guides 21' receive the rack bar 37' and by holding the side sections 28'—28' inwardly and rotating the crank 53, motion will be transmitted through the bevelled gears 54 or other devices used to rotate the shaft 50, resulting in the retraction of the central section 27'. In this modified form of the invention, the hood may be collapsed in a short period of time, and it is to be understood that various features such as the latch shown in Figure 8 as well as the closure may be employed as well with this form of the invention.

It is thought that the foregoing description clearly exemplifies the invention in all respects, and to the extent that one skilled in this art may understand and be able to produce the structure without any difficulty. Furthermore, it is to be understood that while the foregoing description has been in detail, it is to be understood that numerous changes in the specific shape, size and materials may be resorted to without departing from the spirit or scope of the invention as claimed hereinafter.

Having thus described my invention, what I claim as new is:

1. In an automobile having a top proper provided with a recess opening through the front thereof, a top extension member slidable into and out of said recess, and spring means carried by said extension member for urging the same to a position flush with the top proper when in a fully extended position.

2. In an automobile having a top proper provided with a recess opening through the front thereof, a top extension member slidable into and out of said recess, spring means carried by said extension member for urging the same to a position flush with the top proper when in a fully extended position, and spring means carried by said top proper for bearing engagement with said top extension member when said top extension member is housed within said recess for preventing accidental movement thereof.

3. In an automobile having a top proper provided with a recess opening through the front thereof, spaced channel guides mounted within said recess, a top extension member slidably mounted upon said channel guides for movement within said recess and beyond the open front end thereof, and means for limiting the outward and inward sliding movement of said top extension member.

4. In an automobile having a top proper provided with a recess opening through the front thereof, spaced channel guides mounted within said recess, said channel guides each including an upper flange and a lower flange, the front end of said upper flange terminating short of the front end of said lower flange, both said upper flange and said lower flange being curved outwardly at their front ends, a top extension member slidably mounted in said channel guides for movement to an extended position beyond said recess and to a retracted position therein, and flat springs carried by said top extension member for bearing engagement upon the lower flanges of said channel guides substantially as and for the purpose specified.

In testimony whereof I affix my signature.

PAUL OSTRUK.